United States Patent [19]

Stebinger

[11] 4,058,689
[45] Nov. 15, 1977

[54] VARIABLY ADJUSTABLE SHOULDER TELEPHONE HANDSET SUPPORT

[75] Inventor: Albert Eugene Stebinger, Santa Monica, Calif.

[73] Assignee: TSSCO, Santa Monica, Calif.

[21] Appl. No.: 723,543

[22] Filed: Sept. 15, 1976

[51] Int. Cl.² ............................................. H04M 1/05
[52] U.S. Cl. .................................................... 179/157
[58] Field of Search ............................ 179/157, 148 F

[56] References Cited

U.S. PATENT DOCUMENTS

| 2,640,111 | 5/1953 | Samsky et al. | 179/157 |
| 2,644,043 | 6/1953 | Zakos | 179/157 |
| 3,163,722 | 12/1964 | Gomez | 179/157 |
| 3,184,548 | 5/1965 | Krulwich | 179/148 F |

FOREIGN PATENT DOCUMENTS

| 253,125 | 11/1948 | Italy | 179/149 |

Primary Examiner—William C. Cooper

[57] ABSTRACT

A handset support fabricated to be alternately used on either shoulder of a person, and to enable that person to speak and listen over a telephone handset without the need to use his arms or hands, and which does not require the assistance of the users head or neck to hold a required position. The support is instantly changeable from a right to a left shoulder use position, by alternating the position of the handset in the holding receptacle. The handset support includes two configured members of equal width, a frontal member adapted to rest on the users chest and horizontally on the users shoulder, and a back member, adapted to rest angularly on the users shoulder blade, and horizontally on the users shoulder. These members are adjustably connected, and the frontal member may slide back and forth along the horizontal surface of the back member. The means used to adjustably connect these members will hold any desired spacing, and any position of the back member.

Thrusting upward, from the frontal member, and adjustably connected to it, is a flexible arm.

Firmly connected to the top of the flexible arm is a handset holder. This holder is a spring actuated receptacle, and will hold said handset in any required position.

1 Claim, 4 Drawing Figures

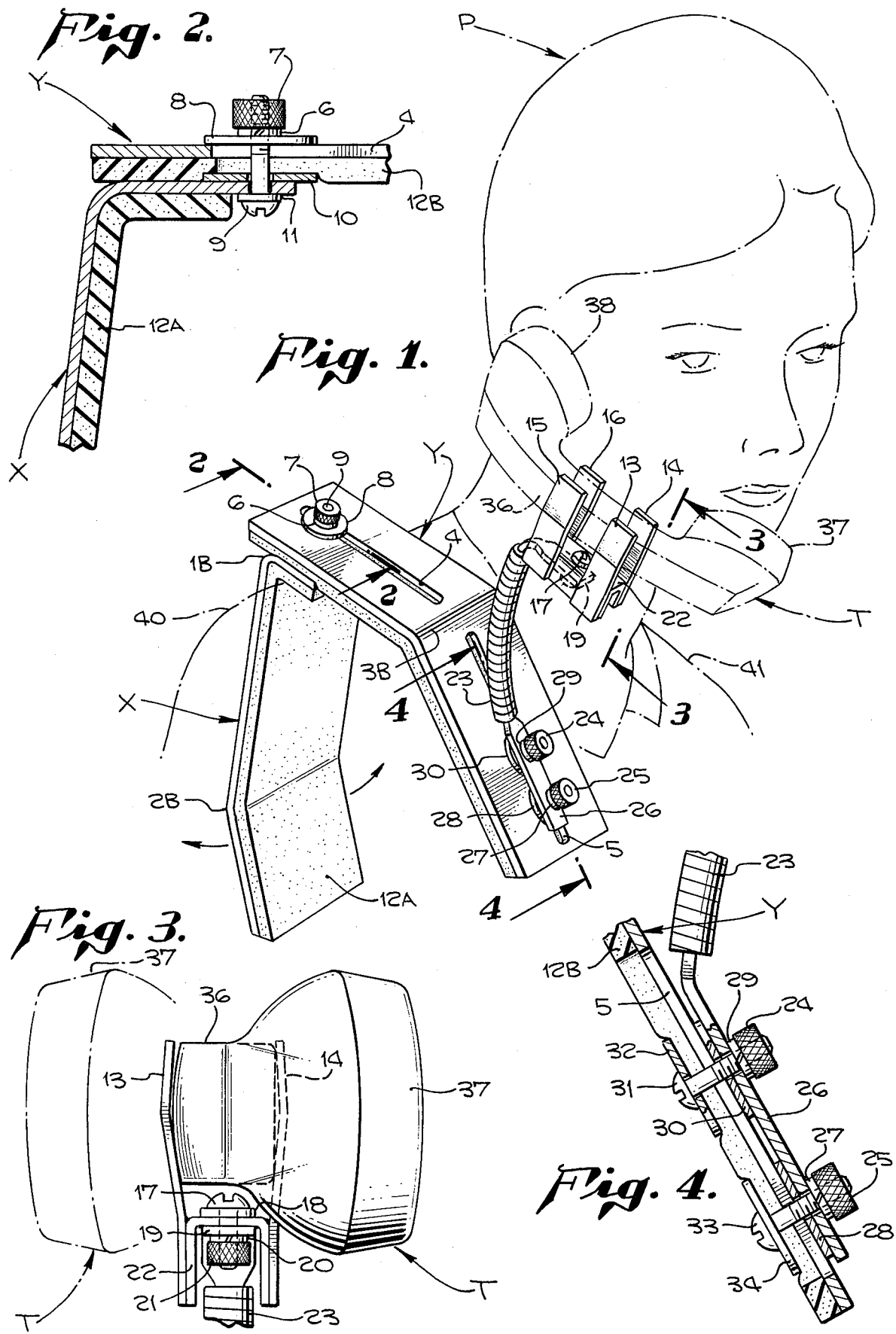

VARIABLY ADJUSTABLE SHOULDER TELEPHONE HANDSET SUPPORT

BACKGROUND OF THE INVENTION

Telephone handset supports adapted for positioning on a persons shoulder, have been in use for many years. Such supports do enable a user to speak and listen over a handset without the need to handhold the instrument. However, most such supports require the combined effort of a user's shoulder and head to hold the support and handset in a use position. This is hardly comfortable procedure for any user required to be constantly on the telephone.

It is certainly not acceptable to those who must carry on long or many telephone conversations, and require their hands for other purposes. Concentration is difficult to keep, when the user is faced with the need of having to physically hold a use position.

SUMMARY

This invention relates to a telephone handset support for use on either shoulder, which of itself holds a handset firmly in any required position, and which does not require the assistance of the head or neck to hold that position, and which permits the unimpeded use of the users hands and arms.

It is an object of this invention to provide a handset support to which adjustments for physical variance in the user, may be quickly and easily made, and use position adjustment of the handset may be instantly made.

The support may be made of aluminum alloy or of plastic, and is engineered for a maximum variety of body types and for maximum comfort. It is specifically designed for people who need the convenience of a handset support and who must work with a minimum of distraction and discomfort.

DESCRIPTION OF DRAWINGS

FIG. 1 is a perspective view of the variably adjustable handset support, in which the handset, shown here in phantom lines, has been inserted in the handset holder in a right shoulder use position.

FIG. 2 is a section on the line of 2—2 in FIG. 1.
FIG. 3 is a section on the line of 3—3 in FIG. 1.
FIG. 4 is a section on the line of 4—4 in FIG. 1.

DETAILED DESCRIPTION

The shoulder support for a telephone handset as shown in FIG. 1 includes a configured back member X and a configured front member Y. These conform to the general outline of the shoulder of the human body. These members are moderately wide, of equal width and covered on the underside with sponge rubber like material applied with glue or other adhesive. This material is labeled 12A or X and 12B on Y. The application insulates the user against the possibility of chafing and works to prevent slippage or undue movement of the support on the users shoulder.

As shown in FIG. 1, the member X is formed at two points, 1B and 2B. Both are formed on a medium radius. 1B breaks from the verticle to the horizontal providing on the horizontal surface a base for an adjustable connection with Y. 2B breaks inwardly from the verticle, and in doing so, makes angular contact with the users shoulder blade. This angular contact gives stability to X as X adjustably connects with Y. Y has a single break, 3B which breaks downward from the horizontal to the slope of the upper chest.

An aperture on the horizontal plane of X and a slot on the horizontal plane of Y provide the openings through which these two members are adjustably connected.

The aperture in X is centered as to width and placed on the horizontal plane as close to the end of the member as practicable. The slot 4 in Y is also centered and runs lengthwise as far along the horizontal plane as is practicable. The member Y slides along the horizontal section of X to adjust. The screw 9 is in a fixed position in X. The slot 4 is the opening necessary to the adjustable connection of the two elements and 4 acts as a guide which sets the limits of adjustment. The adjustable connection uses the following means, see FIG. 2: The head of screw 9 holds the smaller washer 11 against the member X, the large washer 10 rests on the top of X and the underside of 12B. The screw 9 passes through the slot 4, large washer 8 and lock washer 6, and makes threaded attachment with the knurled nut 7.

The particular type of adjustable connection used here, a single screw, permits the pivoting of the member X on the screw 9 to make adjustments for the shoulder blade variations of the user. See arrows FIG. 1.

To adjust for shoulder and other variance, loosen knurled nut 7, slide the member Y to the required spacing, alter the angular plane of contact of X, to the shoulder blade if necessary, and re-tighten 7.

From the basic support, with its adjustments, we move to the handset holder and the related parts. The handset holder begins with a channel 22, see FIGS. 1 and 3, which is of predetermined length and outside diameter. Four configured matched springs are attached to the channel, 22, as shown in FIG. 1. The front outside spring, 13; the front inside spring, 14; back outside spring, 15; and the back inside spring, 16. The configuration of the springs, their relationship to channel 22, and their relationship to the holding section of the handset 36 are stated in FIGS. 3 and 1.

In FIG. 1, the handset T is in phantom lines, and is shown in a right hand use position, and is placed on the right shoulder 40. In FIG. 3, the phantom lines show the handset T in a left hand use position, the corresponding shoulder is 41; all that is required to change the handset from a right to a left hand use position is to remove the handset from the holder, and reinsert the handset with the mouthpiece 37, and the earpiece 38, facing in the opposite direction, see FIG. 1.

Since the handset holder is shorter than the holding portion 36 of the handset itself, there is considerable room to make additional adjustments to the use requirements of the individual.

The springs as shown in FIG. 1, are heliarc welded to the channel 22 and are adjusted to 22 as shown in FIGS. 1 and 3. The configuration of these springs approximates the configuration of the holding portion 36, of the handset T. See FIG. 3.

The handset holder is plastic coated to prevent damage to the handset, and to prevent slippage of 36 within the holder.

We now move to the other minor system in the handset holder assembly, the flexible arm and its related elements. A shaped insert (19) is used to connect the handset holder to the flexible arm (23). This insert fits into the top of 23, and is either welded or epoxied in place.

If it is to be epoxyed, insert 19 should first be roughened. The part 19 has been pre-shaped to form a right angle on a large radius, and is pre-drilled. The insert portion of 19 must be long enough to fit into 23 and to hold. That portion which forms a right angle and connects 22 to 23, must be long enough to take its aperture to the aperature in 22, and wide enough to substantially occupy the interior width of 22. These parts are connected in the following manner. From the top downward, see FIG. 3. Screw 17 passes through washer 18, through aperture 19, through lock washer 20, to a threaded attachment with knurled nut 21.

On the other end of 23 there is also an insert, 26. This insert is shaped to conform to part Y as it rests on the users chest, and then the part 26 rises upward, see FIG. 4. There are two apertures in this insert. This insert is attached to the lower end of 23 as is 19.

The element Y and the insert 26 are adjustably connected through slot 5 in part Y and the apertures in 26. Slots 5 permits and guides the upward or downward ajustment of the handset holder assembly to compensate for physical variance of the user, see FIG. 1. To adjust the assembly knurled nuts 24 and 25 are loosened, part 26 and the rest of the assembly are moved along 5 to the required position, and the knurled nuts are then tightened. To hold the handset holder assembly in any desired position, the following means are used. The head of screw 31 holds large washer 32 to the surface of 12B. 31 then passes through 12B and slot 5, through large washer 30, through 26, through lock washer 29 to a threaded attachment of screw to knurled nut 24.

The screw 33 holds the washer 34 against 12B and the member Y, as the screw passes through the aperture in Y and through the washer 28 and the aperture in 26 and the lock washer 27 to a threaded engagement with the knurled nut 25.

It should be understood that the embodiment described in the detailed description is only illustrative of the concepts which underlie the present invention.

I claim:

1. A shoulder support for a telephone handset comprising: a configured frontal member and a configured back member, said frontal and back members being adapted to rest on the chest and shoulder blade of the user, said back member being adapted to make angular contact with the shoulder blade of the user, said frontal and back members being adjustably connected to rest on a shoulder of the user, means for the adjustable connection holding said members in a desired spacing, and means for the adjustable connection holding said back member in varying planes of contact with a shoulder blade of the user, said members being substantially covered on their undersides with a sponge rubber like material; a flexible arm thrusting upwards from the chest portion of said frontal member, said flexible arm being adjustably connected to the chest portion of said frontal member, the means for the adjustable connection holding said flexible arm in an upward or downward adjustment, said flexible arm being firmly and adaptably connected at its other end to a plastic coated, spring actuated handset holder; comprising a channel of predetermined length and outside diameter, four matched configured springs, means to attach said springs to said channel, said springs being set in opposition at each end of said channel, said springs being set evenly against the outside edge of said channel, said springs being set with the distended side out, said handset holder being adapted to permit the instantaneous insertion or removal of a telephone handset, said handset holder being shorter than the hand held portion of a telephone handset.

* * * * *